Dec. 10, 1957 E. H. GATZERT 2,816,170

CONNECTOR CIRCUIT PARTY RINGING SELECTION

Filed May 31, 1956 2 Sheets-Sheet 1

INVENTOR.
ERNEST H. GATZERT
BY J. Warren Whitesel
ATTORNEY

Dec. 10, 1957 E. H. GATZERT 2,816,170

CONNECTOR CIRCUIT PARTY RINGING SELECTION

Filed May 31, 1956 2 Sheets-Sheet 2

CONNECTOR 5

INVENTOR,
ERNEST H. GATZERT

BY [signature]

ATTORNEY

United States Patent Office 2,816,170

Patented Dec. 10, 1957

2,816,170

CONNECTOR CIRCUIT PARTY RINGING SELECTION

Ernest H. Gatzert, Rochester, N. Y., assignor to General Dynamics Corporation, Rochester, N. Y., a corporation of Delaware Application May 31, 1956, Serial No. 588,352

6 Claims. (Cl. 179—17)

This invention relates to automatic telephone systems and more particularly to improved connectors for use in automatic telephone systems.

Telephone systems may be arranged to extend calls under many different types of conditions. For example, on calls to party line subscribers, it may be desirable to furnish means for signaling one subscriber without signaling other subscribers on the same line. One scheme which may be used requires means for transmitting ringing or other signaling current over one side of a line during certain calls, and for transmitting ringing or other signaling current over the other side of a line during other calls. A scheme of this type requires means for determining which side of the line is to be used for signaling purposes. A common method of providing for this determination is to combine with each connector a minor switch that is adapted to be positioned in accordance with a ringing or signaling current selecting digit. For example, if a minor switch is operated to certain of a plurality of positions, ringing or signaling current may be projected over one side of a line and if a minor switch is operated to others of a plurality of positions, ringing or signaling current may be projected over the other side of a line. Wherever possible, it is desirable to eliminate costly equipment, such as a minor switch, as by providing some other less costly means for controlling the transmission of ringing or signaling current.

An object of this invention is to provide a new and improved connector.

Another object of this invention is to provide a new and improved means for determining which side of a line may be utilized for transmitting ringing or other currents to signal a party line subscriber station.

Still another object of this invention is to provide means for extending signals to connectors for predetermining which side of a line may be used to carry ringing or signaling current.

This invention accomplishes these and other objects by providing new and improved connector means adapted to receive signals from preceding equipment to determine which of two sides of a line is to carry signaling current. More particularly, the specific embodiment of my invention that is shown in my drawing may be used with a so-called four wire system and provides means for extending markings over the fourth wire or helping sleeve conductor on a selective basis, thereby determining which of two talking conductors may be used for carrying signaling currents. A convenient means for determining the nature of a marking that may be applied to a fourth wire is dependent upon the level to which a preceding switch may have been stepped. It should be understood, however, that other suitable means may be used also.

Further objects and advantages of my invention may be understood by referring to the following description when taken in connection with the accompanying drawings in which:

Fig. 1 is a block diagram illustrating a telephone system embodying the principles of my invention; and Fig. 2 is a detailed circuit drawing of a connector that may be used in such a telephone system.

I have tried to use simple and specific terms where possible to facilitate an understanding of the invention; however, I want it understood that the use of these simple and specific terms is not to act in any manner as a disclaimer of the full range of equivalents which is normally given under established rules of patent law. To illustrate, hereinafter, I refer to my invention as relating to switching means of the type that is known in the art as a "connector," when, in fact, my invention is broader and may relate to any switching means that may be used to extend ringing current. Also, I have shown my invention in connection with a flat-type, two-motion, step-by-step switch. Not only is the invention not limited to this particular switch, but also it is not necessarily limited to step-by-step switches. Further, the attached drawings show the source of office potential by means of plus (+) and minus (−) signs. As in most telephone systems, the plus terminal is described as being connected with ground; however, it should be understood that either this or any other suitable power supply may be used. Still further, the heavily inked lines used to outline block 5 indicates that portion of the system which is shown in detail by means of Fig. 2. The remaining blocks in Fig. 1, that are shown by lightly inked rectangles, are items which are well known to those skilled in the art. Any suitable equipment may be used to provide the functions represented by these blocks. Quite obviously, other examples could be selected to illustrate the manner in which the specific terms that I have used are entitled to a wide range of equivalents.

*Brief description*

Reference is made to Fig. 1 which shows an extremely simple switching system that may use my invention. For example, subscriber A is illustrated as a calling subscriber who initiates calls by removing his receiver or handset and responsive thereto a loop is completed across a line thereby marking line circuit 1 as serving an unanswered call. Line circuit 1, allotter 3, and line finder 2 cooperate to find and seize the calling line. Thereafter, dial tone is returned to subscriber A who transmits a suitable number of digit indications to designate the directory number of a called subscriber. One digit in such a directory number may be utilized to drive selector 4 to a particular level and eventually to seize idle equipment such as connector 5, for example. The selector 4 may be provided with a flat-type selecting switch having auxiliary brushes and terminals such as generally indicated by the bank XX and the selector is arranged so that the XX brush is driven to a particular position in bank XX which is an indication of the value of the digit that was used to drive selector 4 in the primary direction. As shown in the drawing, every other terminal in bank XX of selector 4 is marked by ground (+) potential; although, it should be obvious that other arrangements could be provided also.

Means is provided for extending markings to a connector to indicate whether signal current is to be extended over the ring or the tip side of the line. That is, after idle equipment such as connector 5 is found, any suitable means, not shown, operates switchthrough relay *4d* thereby closing contacts *4a*. A marking is now extended from bank and brush XX through contacts *4a*, HS brush *4b*, terminal *4c*, contacts 147, 156, 162*a*, and the upper winding of busy test relay 160 to (−) battery. The busy test relay 160 is of the well known two-step type having a first or preliminary operated position and a second or fully operated position. If brush XX is standing on a terminal in bank XX which is marked by ground potential, busy test relay 160 operates to its "X" or first step operated position to indicate that the tip conductor T′ is to be used for ringing; however, if brush XX is standing on a terminal in bank XX which is marked by an absence of ground potential, busy test relay 160 is not operated to indicate that ringing conductor R′ is to be used for ringing. More particularly, if busy test relay 160 is operated to its first step position, preliminary "X" contacts 165 and 167 close while preliminary "X" contacts 166 and 168 open. Therefore, ringing or signaling current is transmitted from a suitable generator (not shown) through the upper winding of ring trip relay 150, operated contacts 165, contacts 155, conductor T′, line circuit 6, and the subscriber stations B and C where one of the ringers or signal devices is connected between conductor T′ and ground (+). On the other hand, if busy test relay 160 is not operated, contacts 165—168 remain in the normal or unoperated condition shown in the drawings so that ringing or signaling current is transmitted from a suitable generator through the upper winding of ring trip relay 150, resting contacts 168 and 154, conductor R′, line circuit 6, and subscriber stations B and C where the other ringer or signal device is connected between conductor R′ and ground (+). Thus, it is seen that the selection between extending ringing or signaling current over conductor T′ or over conductor R′ is made in accordance with a special signal which is forwarded as by level marking means indicating the position to which selector 4 has been driven. In this manner, the need for a special ringing or signaling current selecting digit and for a minor switch adapted to respond to this digit is eliminated.

Means is provided for operating busy test relay 160 to its second step or fully operated condition to indicate that the called line is busy. To this end, busy test relay 160 may be fully operated to its second step responsive to markings which are extended over conductor S′ to indicate the busy state of the called line. Hence, it is seen that busy test relay 160 has three possible operative positions. Its first or unoperated position indicates both an idle line and that ringing current is to be extended over ring conductor R′; its "X" or first step operated position indicates that ringing current is to be extended over tip conductor T′; and its second step or fully operated position indicates that the called line is busy.

It is noted again that the illustration shown in the drawing is by way of example only, and that other suitable equipment may be used to extend the marking from preceding equipment to connector 5.

*Detailed Description*

Figure 2:
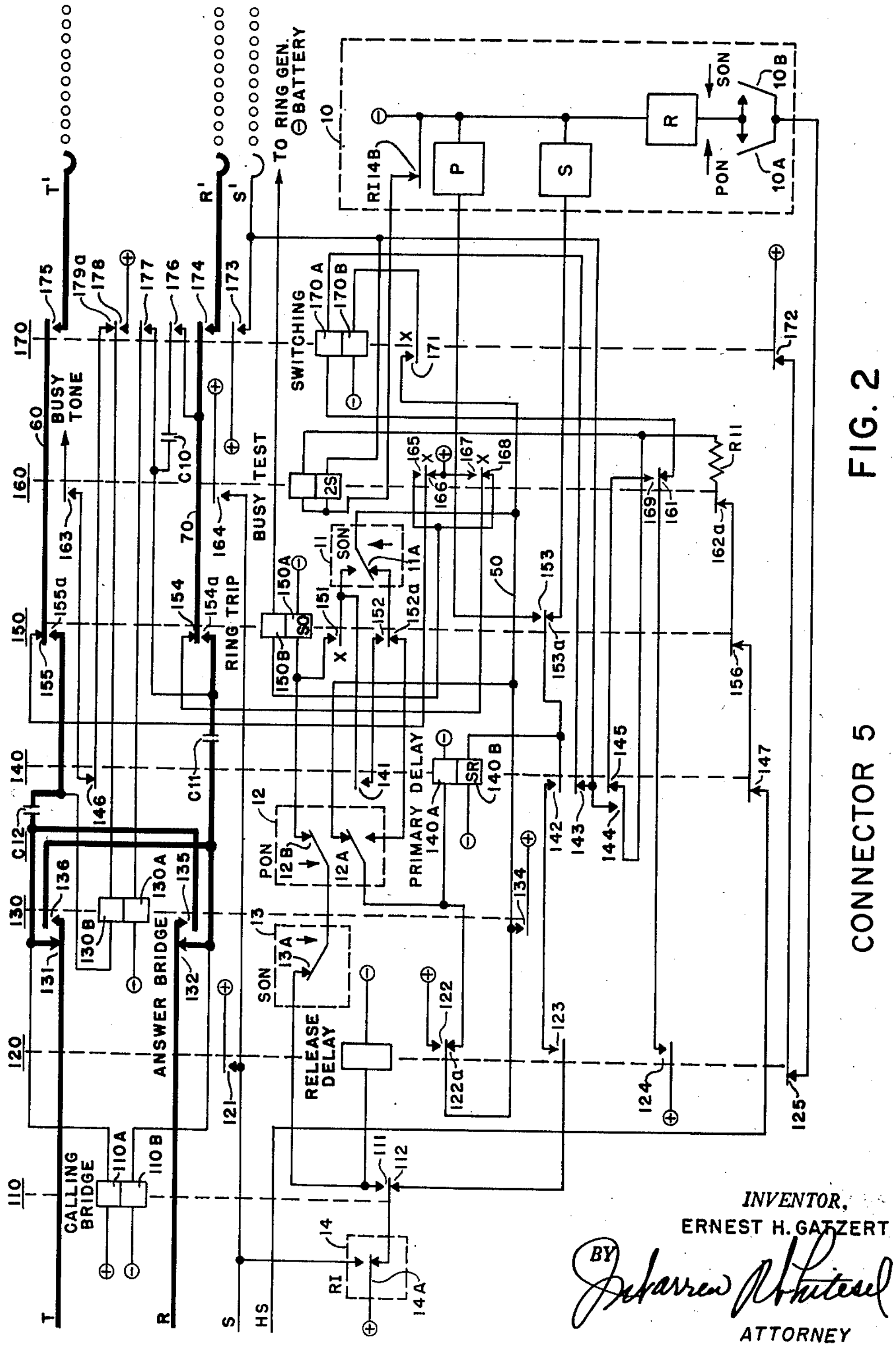

Referring to Fig. 2, it should be understood that the circuit (connector 5) is intended to control, as by operating stepping magnets P and S, for example, the directive movement of a two-motion switch. A release magnet R may be used to return the switch brushes to a normal position. When the switch moves off-normal in either direction, primary off-normal contacts (PON) or secondary off-normal contacts (SON), as the case may be, are operated. The contacts, marked RI, that are enclosed within dotted rectangles 10 and 14 are operated when release magnet R is energized.

*Seizure.*—Means is provided for seizing connector 5 to extend a call and to provide signal current. If connector 5 is idle, there is an absence of ground (+) potential on sleeve conductor S so that connector 5 may be seized by preceding automatic telephone circuits such as by a selector circuit or the like. Upon seizure a loop is completed by any suitable means (not shown) across the incoming tip and ring conductors T and R to operate calling bridge relay 110 over the circuit extending from ground (+) through winding 110A, normal contacts 131, conductor T, the loop through preceding equipment, conductor R, normal contacts 132, and winding 110B to (−) battery.

Responsive to the operation of calling bridge relay 110, contacts 111 close to operate release delay relay 120 over the circuit which extends from (−) battery through the windings of release delay relay 120, operated contacts 111, and normal release magnet contacts RI—14A to ground (+).

Figure 1:
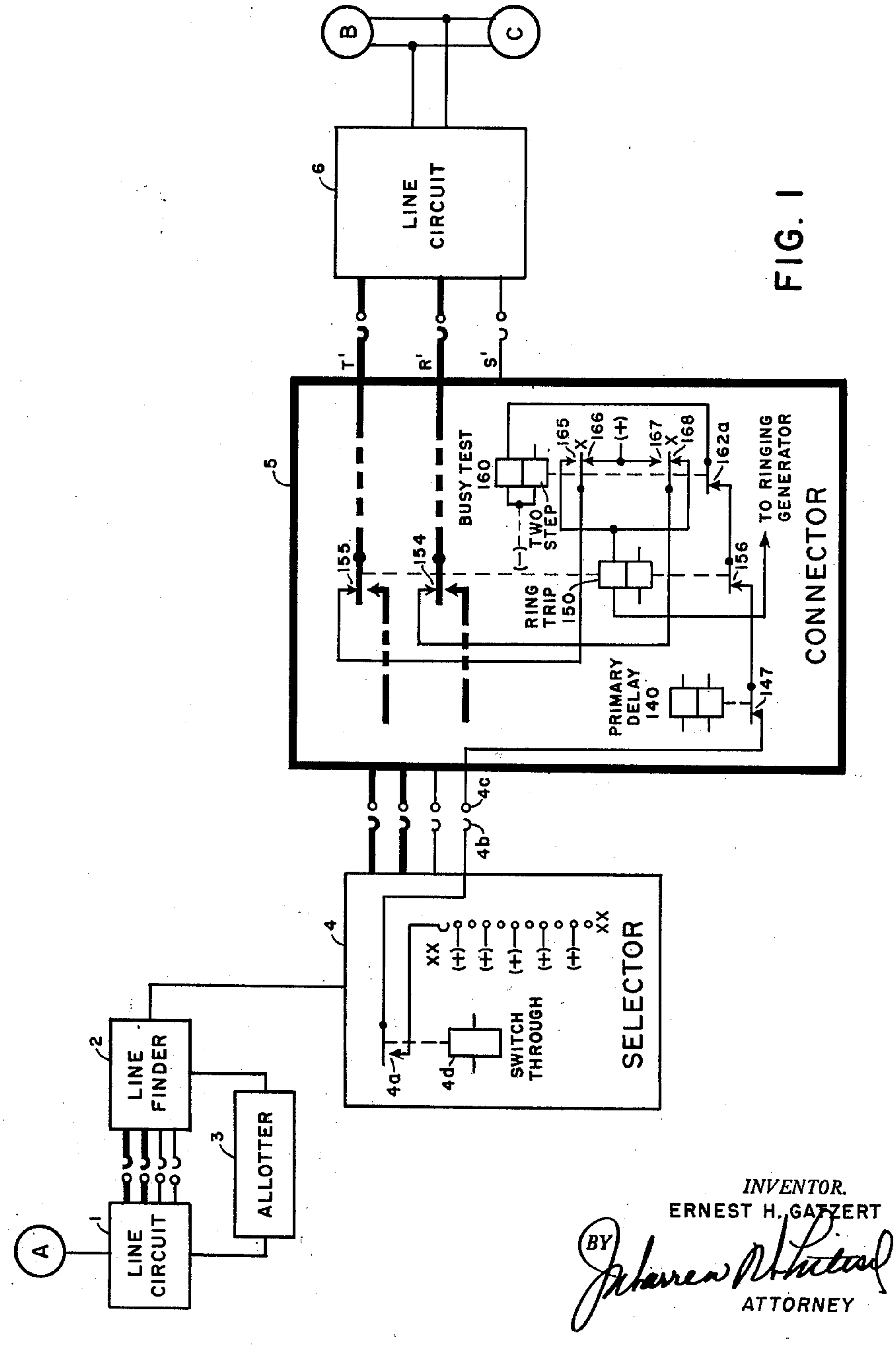

Means is provided for extending markings over an extra sleeve conductor to indicate the manner in which signal current is to be extended. Two assumptions may be made about the potential that is applied to extra sleeve or control conductor HS. First, it may be assumed that any suitable preceding equipment has been operated to apply a ground (+) potential to conductor HS, and, second, it may be assumed that any suitable preceding equipment has been operated to apply an absence of ground marking to conductor HS. For the purposes of this description it is assumed that a ground marking is applied to conductor HS as by brush XX (Fig. 1). Therefore, two-step busy test relay 160 is prepared to operate to its first step over a circuit which may be traced from (−) battery through release magnet contacts RI—14B, the upper winding of busy test relay 160, resistor R11, rest contacts **162*a*, 156 and 147, and conductor HS to the ground marking that is applied by the preceding equipment. This circuit is open at this time due to the operation of relays 140 and 150, as explained below. The inclusion of resistor R11 reduces the current sufficiently so that two-step busy test relay 160 will operate to its first step and thereby actuates only its "X" or preliminary contacts 165—168. As will be pointed out below, primary delay relay 140 operates and releases while digit pulse trains are being received so that relay 160** is not operated by markings on conductor HS at the time when a busy test is made.

The aforementioned operation of release delay relay 120 causes primary delay relay 140 to operate over the circuit which extends from (−) battery through the upper winding of primary delay relay 140, resting primary off-normal contacts (PON) 12A, and operated contacts 122 to ground (+). At this time, ring trip relay 150 is operated by the circuit extending from (−) battery through the lower winding of ring trip relay 150, resting contacts PON12B, SON13A, operated contacts 111 and resting contacts 14A to ground (+). Upon operating, ring trip relay 150 closes a holding circuit for itself which extends from (−) battery through the lower winding of relay 150, "X" or preliminary make contacts 151, operated contacts 141 and 152, and normal contacts 11A to master ground by way of conductor 50 and contacts 122.

*Digit pulses.*—Means is provided for operating connector 5 responsive to a first group of dial impulses. It may be noted that the operation of ring trip relay 150 closed contacts 153 to energize stepping magnet P in parallel with winding 140B of primary delay relay 140. The circuit for magnet P extends from (−) battery through the winding of magnet P, resting contacts 153, operated contacts 142, 123 and 112 (when calling bridge relay 110 is released on the first digit pulse), and then to ground (+) on normal release magnet contacts RI—14A. The circuit for primary delay relay 140 extends from (−) battery through winding 140B, contacts 142, 123, 112 and RI—14A to ground (+). Thus, contacts 111 are pulsed from operated to normal conditions in response to a first group of dial impulses. Primary stepping magnet P is operated simultaneously with each digit pulse, thereby driving brushes T′, R′ and S′ in a primary direction at the rate of one step per pulse. The winding 140A of primary delay relay 140 is de-energized after receipt of the first dial pulse since its operating circuit is now open at contacts PON12A which are operated as soon as the switch steps off-normal in the primary direction; therefore, during the digit pulse train, relay 140 is maintained operated due to pulsing current in winding 140B and to its own slow release characteristics. After completion of the first train of dial impulses, calling bridge relay 110 and contacts 111 remain operated to open the circuit to winding 140B of primary delay relay 140 which restores.

Upon restoration of primary delay relay 140, contacts 141 restore to break the holding circuit for ring trip relay 150 that had been extended from (−) battery through winding 150A, "X" or preliminary contacts 151, operated contacts 141, 152 and 11A, conductor 50, and operated contacts 122 to ground (+). When ring trip relay 150 restores, primary delay relay 140 is reoperated over the circuit extending from master ground at contacts 122 over conductor 50, resting secondary off-normal contacts 11A, normal contacts 152*a*, operated primary off-normal contacts 12A, and the upper winding 140A of primary delay relay 140 to (−) battery. With primary delay relay 140 again operated and ring trip relay 150 restored, a circuit is established for energizing stepping magnet S in parallel with winding 140B of primary delay relay 140 in response to the second group of digit pulses. That is, each time that a digit pulse is received by calling bridge relay 110, a circuit is completed which may be traced from ground (+) on contacts RI—14A, through resting contacts 112, operated contacts 123 and 142, and winding 140B to (−) battery and in parallel therewith through contacts 153*a* and the winding of secondary magnet S to (−) battery. Each time that contacts 112 close responsive to a digit pulse, secondary magnet S operates to drive the brushes one step in their secondary direction. Winding 140B receives pulse-like energizing current and the slow release characteristics of primary delay relay 140 are such that it holds operated throughout the receipt of a digit pulse train.

*Switchthrough.*—Assuming that the bank terminals of the called line are idle, as indicated by a resistance battery potential (not shown) on sleeve brush S′, the connector circuit operates to switchthrough and connect ringing current to the called line. That is, primary delay relay 140 restores at the completion of the second digit pulse train and ground (+) is extended through operated contacts 124, normal contacts 161, winding 170A of switching relay 170, and normal contacts 143 to resistance battery (not shown) on sleeve brush S′, thereby causing switching relay 170 to operate. When primary delay relay 140 releases, contacts 147 close to reoperate busy test relay 160 if ground (+) is applied to conductor HS.

When switching relay 170 operates, it establishes a holding path for itself which extends from master ground (+) on contacts 122 over conductor 50, operated "X" or preliminary contacts 171, and lower winding 170B of switching relay 170 to (−) battery. Relay 170 also operates contacts 172 for preventing the operation of release magnet R at this time. Contacts 173 close to apply a busy marking potential of ground (+) to sleeve brush S′ thereby marking the called line busy to other connectors. Operation of switching relay 170 also closes contacts 175 and 174 to connect the tip and ring brushes T′ and R′ to tip and ring conductors 60 and 70.

It was assumed, in an earlier part of this description, that busy test relay 160 operated responsive to a ground potential which is extended over conductor HS through contacts 147, 156 and 162*a*, resistor R11, the upper winding of busy test relay 160, and release magnet contacts RI—14B to (−) battery. Since this circuit includes resistor R11, busy test relay 160 operates only its "X" or preliminary contacts. Therefore, when relay 170 closes contacts 174 and 175, as explained above, ringing current is extended over a circuit which may be traced from a ringing generator (not shown) through upper winding 150B of ring trip relay 150, operated contacts 165, resting contacts 155, operated contacts 175, brush T′, and a circuit extending to the called subscriber station where a ringer is connected between conductor T′ and ground (+). The ringing current is superimposed upon (−) battery, but ring trip relay 150 does not operate since the direct current loop circuit is opened at the hookswitch control of the called subscriber's station until he answers. Operated contacts 176 of switching relay 170 connect capacitor C10 to by-pass open contacts 154*a*, thereby providing a path for extending ring-back tone which may be traced from the generator through winding 150B, contacts 165, 155 and 175, brush T′, the loop to the called station brush R′, contacts 174 and 176, capacitors C10 and C11, normal contacts 132 and conductor R to the calling subscriber station. The operation of switching relay 170 also closes contacts 177 and 178 to establish a circuit for energizing answer bridge relay 130 when ring trip relay 150 is operated after the called party answers.

*Answer supervision.*—When the called party answers, a direct current loop circuit is completed between brushes T′ and R′ so that (−) battery, superimposed upon the ringing current, is extended through winding 150B, operated contacts 165, rest contacts 155, operated contacts 175, brush T′, the loop extending to and from the called subscriber station, brush R′, operated contacts 174, rest contacts 154 and operated contacts 167 to ground (+). As ring trip relay 150 operates, "X" or preliminary make contacts 151 are closed to provide a holding circuit which extends from (−) battery through winding 150A, operated "X" contacts 151, operated secondary off-normal contacts 11A, and conductor 50 to master ground (+) at contacts 122. When ring trip relay 150 operates, contacts 154 and 155 open thereby disconnecting ringing current from the talking conductors. Contacts 156 open to release busy test relay 160, if it is then operated responsive to the application of ground (+) to conductor HS. Contacts 155*a* and 154*a* close thereby connecting brushes T′ and R′ with conductors T and R, respectively. The talking circuit now extends over the heavily inked conductors shown near the top of Fig. 2.

Also responsive to answer by the called subscriber, answer bridge relay 130 operates over the circuit which may be traced from (−) battery through winding 130A, operated contacts 177, 154*a* and 174, brush R′, the loop extending to and from the called subscriber station, conductor T′, operated contacts 175 and 155*a*, winding 130B, and operated contacts 178 to ground (+). The operation of answer bridge relay 130 provides reverse battery answer supervision by the operation of contacts 131, 132, 135 and 136 in the well known manner.

*Busy test.*—In the foregoing circuit description, it has been assumed that connector 5 seized an idle line and now it is assumed that the called line is busy when seized and that ground (+) is applied by any suitable means (not shown) to sleeve brush S′ thereby preventing the operation of switching relay 170 since both sides of its upper winding are connected to ground (+) so that switching relay 170 is shunted.

In greater detail, the busy testing of the called line takes place as brush S′ encounters terminals in the bank of the switch and before primary delay relay 140 is released. More specifically, primary delay relay 140 has slow release characteristics so that there is a time delay between the end of a digit pulse train and the release of relay 140 which has been holding responsive to its own slow release characteristics and responsive to pulse-like energizing current that is extended during digit pulsing from contacts 112 now open. The busy test is made during this time delay period, thus contacts 147 are provided to release busy test relay 160 during this test if a ground (+) potential is applied to conductor HS.

If the called line is busy, ground (+) on sleeve brush S′ is first connected through operated contacts 144, the upper winding of busy test relay 160, and resting release magnet contacts RI—14B to (−) battery. Meanwhile, a circuit is also completed from sleeve conductor S′ directly through the lower winding of busy test relay 160 and resting release magnet contacts RI—14B to (−) battery. When busy test relay 160 is operated over both of its windings, it moves to its second step thereby operating all contacts, and not just those which are marked by the letter "X." Contacts 169 close to prepare for continued energization of the upper winding of relay 160 after primary delay relay 140 restores, the circuit extending from ground (+) at contacts 124, through operated contacts 169, resting contacts 145, the upper winding of busy test relay 160, and resting release magnet contacts RI—14B to (−) battery. Contacts 161 open further to guard against an inadvertent operation of switching relay 170. Contacts 163 close to extend busy tone over a circuit which may be traced from a busy tone generator (not shown) through operated contacts 163, resting contacts 146 and 179*a*, winding 130B of answer bridge relay 130, capacitor C12, resting contacts 131 and conductor T to the calling subscriber station.

*Release*.—Assuming that connector 5 has been directively operated to connect with a busy line, only relays 110, 120 and 160 are operated, primary delay relay 140 having released at the end of a digit pulse train, as explained above. When the calling party hangs up, relays 110 and 120 are restored due to a breaking of the calling line loop circuit by the calling subscriber's hookswitch. Restoration of relay 120 restores contacts 125 to their normally closed position to connect a circuit from ground (+) on contacts 172 through contacts 125, the operated primary and secondary off-normal contacts 10A and 10B and through the winding of release magnet R to (−) battery. Thus, release magnet R is energized and the switch is released to restore brushes T′, R′ and S′ to normal. During the energization of release magnet R, contacts RI—14A are operated to connect ground (+) to incoming sleeve conductor S and thereby prevent seizure of connector 5 while the switch is returning to normal. Busy test relay 160 releases, when either contacts 124 or contacts RI—14B open depending upon when the busy marking may be removed.

Assuming next that connector 5 has been directively operated to seize an idle called line and that the call is completed when a called party answers, relays 110, 120, 130, 150 and 170 are operated as described before. The circuit arrangement is such that as long as release delay relay 120 and switching relay 170 are operated, release magnet R cannot be operated since its energizing circuit is open at contacts 172 and 125. Release delay relay 120 is held by continued operation of calling bridge relay 110, which is held by the calling subscriber, and switching relay 170 is held by answer bridge relay 130, which is held by the called subscriber.

If the calling subscriber is the first to hang up, relays 110 and 120 restore to release the preceding switching equipment by removing ground at contacts 121 from sleeve conductor S. Primary delay relay 140 operates over the circuit extending from ground (+) through operated contacts 134, normal contacts 12A, and upper winding 140A of primary delay relay 140 to (−) battery. Busy test relay 160 reoperates over a circuit which may be traced from ground (+) on operated contacts 173, through operated contacts 144, the upper winding of busy test relay 160, and resting release magnet interrupter contacts RI—14B to (−) battery. Another circuit for busy test relay 160 may be traced from ground (+) through contacts 173 and the lower winding of busy test relay 160 to (−) battery via contacts RI—14B. With busy test relay 160 thus operated, ground (+) is connected through operated contacts 164 to incoming sleeve conductor S, thereby extending a guarding potential to prevent a reseizure of connector 5 before the called subscriber hangs up.

Thereafter, when the called party hangs up, answer bridge relay 130 is restored to open contacts 134 and remove a holding ground (+) from master ground conductor 50 thus de-energizing winding 170B of switching relay 170 for causing it to restore. Contacts 172 close to operate release magnet R over a circuit which may be traced from (−) battery through the winding of magnet R, operated primary and secondary off-normal contacts 10A and 10B, resting contacts 125 and 172 to ground (+). When master ground is removed at contacts 134 or when release magnet interrupter contacts operate, all operated relays restore. It is thought that it is not necessary to trace all release circuits in detail since they have already been described and are obvious from the drawing.

The foregoing specification has described an improved form of a connector that includes means for extending ringing current selectively over either a tip or ring conductor depending upon markings which may be forwarded from a preceding circuit. While the foregoing circuit description has assumed that a ground (+) marking is extended over conductor HS to operate busy test relay 160, it should be obvious that if there is an absence of ground marking, busy test relay 160 does not operate when ringing current is applied to a line. Therefore, with relay 160 released, ringing current is applied over the circuit which may be traced from a generator (not shown) through winding 150B, resting contacts 168 and 154, operated contacts 174, conductor R′ extending to the called subscriber line and through a ringer that is connected between conductor R′ and ground (+). Upon answer, ring trip relay 150 is operated over the circuit extending from (−) battery superimposed upon the ringing generator through winding 150B, contacts 168, 154 and 174, conductor R′, the called loop, conductor T′, and contacts 175, 155 and 166 to ground (+).

While I have shown and described a specific embodiment of my invention, other modifications may readily occur to those skilled in the art. Therefore, I do not want my invention to be limited to the specific arrangement shown and described, and I intend in the appended claims to cover all modifications that fall within the true spirit and scope of my invention.

What is claimed is:

1. A device for extending ringing current through connecting means for selectively connecting at least one preceding circuit to one of many succeeding circuits, said means having incoming connections from said preceding circuit and outgoing connections to said succeeding circuit, said succeeding circuits being subject to idle and busy conditions, said incoming connection including at least one conductor, said outgoing connection including at least two conductors, means in said preceding circuit for selectively extending markings over said one incoming conductor, means in said connecting means including a relay having at least three positions of operation, means for placing said relay in a first of said positions of operation responsive to said busy conditions, means responsive to placing said relay in said first position for disabling said connecting means, means responsive to a particular of said markings for placing said relay in a second of said positions for selecting one of said two conductors, means responsive to other of said markings for placing said relay in a third of said positions for selecting the other of said two conductors, and means for transmitting signaling current over the selected one of said talking conductors if said succeeding circuit is idle when seized.

2. In a telephone system, first switching means being divided into levels through which calls may be extended, connecting means for selectively connecting a first of said switching means to succeeding circuits, said connecting means having incoming connections extending from said first switching means and outgoing connections extending to said succeeding circuits, said succeeding circuits being subject to idle and busy conditions, said incoming connections including at least one conductor, said outgoing connections including at least two conductors, means in said preceding circuit for selectively extending level markings over said one incoming conductor responsive to selection of one of said levels that is used to extend a particular call, means in said connecting means including a relay having three positions of operation, means for placing said relay in a first of said positions of operation responsive to said busy conditions, means responsive to placing said relay in said first position for disabling said connecting means and returning a busy signal over said incoming connection, means responsive to particular ones of said level markings for placing said relay in a second of said positions for selecting one of said two conductors, means responsive to other of said level markings for placing said relay in a third of said positions for selecting the other of said two conductors, and means for transmitting signaling current over the selected one of said talking conductors.

3. In a telephone system, connector means for extending calls responsive to at least one digit pulse train, at least one slow release relay having break contacts in said connector means, means for holding operated said slow release relay responsive to receipt of said digit pulse train, said connector means having incoming connections extending from preceding circuits and outgoing connections extending to succeeding circuits, said incoming connections including at least one conductor connected through said break contacts, said outgoing connectors including at least two conductors, means in said preceding circuit for selectively extending markings over said one incoming conductor via said break contacts, means in said connecting means for responding to said markings, and means responsive to said last named means for selectively controlling the extension of signaling current over either of said two conductors of said outgoing connection.

4. In a telephone system, connector means for extending calls responsive to at least one digit pulse train, at least one slow release relay having break contacts in said connector means, means for holding operated said slow release relay responsive to receipt of said digit pulse train, said connector means having incoming connections extending from preceding circuits and outgoing connections extending to succeeding circuits, said incoming connections including at least one conductor extending through said break contacts, said outgoing connections including at least two conductors, means in said preceding circuit for selectively extending markings over said one incoming conductor via said break contacts, means in said connector means including a relay having contacts that are movable between either of at least two positions responsive to said markings, means responsive to an operation of said last named contacts to one of said positions for selecting one of said talking conductors, means responsive to an operation of said last named contacts to the other of said positions for selecting the other of said talking conductors, and means for transmitting signaling current over the selected one of said talking conductors.

5. In a telephone system, first switching means being divided into levels through which calls may be extended, connector means for extending calls from said first switching means to succeeding circuits responsive to at least one digit pulse train, at least one slow release relay having break contacts in said connector means, means for holding operated said slow release relay responsive to receipt of said digit pulse train, said connector means having incoming connections extending from said first switching means to said succeeding circuits, said incoming connections including at least a control conductor connected through said break contacts, said outgoing connections including at least two talking conductors, means in said preceding circuit for selectively extending level markings over said control conductor responsive to selection of one of said levels that is used to extend a particular call, means in said connector means including a relay having contacts that are movable between either of at least two positions responsive to said level markings, means responsive to an operation of said movable contacts to one of said positions for selecting one of said talking conductors, means responsive to an operation of said movable contacts to the other of said two positions for selecting the other of said talking conductors, and means for transmitting signaling current over the selected one of said talking conductors.

6. In a telephone system, first switching means being divided into levels through which calls may be extended, connector means for extending calls from said first switching means to succeeding circuits responsive to at least one digit pulse train, said succeeding circuits being subject to idle and busy conditions, at least one slow release relay having break contacts in said connector means, means for holding operated said slow release relay responsive to receipt of said digit pulse train, said incoming connections including at least one conductor connected through said break contacts, said outgoing connections including two conductors, means in said preceding circuit for selectively extending level markings over said one incoming conductor responsive to selection by said first switching means of one level that is used to extend a particular call, means in said connecting means including a relay having three operated positions, means for placing said relay in a first of said positions of operation responsive to said busy conditions, means responsive to placing said relay in said first position for disabling said connector means, means responsive to particular of said markings for placing said relay in a second of said positions for selecting one of said two conductors, means responsive to other of said markings for placing said relay in a third of said positions for selecting the other of said two conductors, and means for transmitting signaling current over the selected one of said talking conductors.

References Cited in the file of this patent

UNITED STATES PATENTS

| | | |
|---|---|---|
| 1,284,730 | Piper | Nov. 12, 1918 |
| 1,284,924 | Lundell | Nov. 12, 1918 |
| 1,356,639 | Lundell | Oct. 26, 1920 |
| 1,660,975 | Quass | Feb. 28, 1928 |